(12) United States Patent
Yang

(10) Patent No.: US 7,032,329 B2
(45) Date of Patent: Apr. 25, 2006

(54) COMPOSITE REINFORCED TOECAP AND A METHOD OF MAKING THE SAME

(75) Inventor: Willy H. Yang, Kaohsiung (TW)

(73) Assignee: Sakurai Sports Mfg. Co., Ltd., Kaohsiung Hsien (TW)

( * ) Notice: Subject to any disclaimer, the term of this patent is extended or adjusted under 35 U.S.C. 154(b) by 225 days.

(21) Appl. No.: 10/752,016

(22) Filed: Jan. 7, 2004

(65) Prior Publication Data

US 2005/0144809 A1 Jul. 7, 2005

(51) Int. Cl.
*A43C 13/14* (2006.01)

(52) U.S. Cl. ..................... 36/77 R; 36/77 M
(58) Field of Classification Search .............. 36/77 M, 36/77 R
See application file for complete search history.

(56) References Cited

U.S. PATENT DOCUMENTS

| 1,345,944 | A | * | 7/1920 | Macdonald | 428/141 |
| 1,715,299 | A | * | 5/1929 | Macdonald | 12/61 R |
| 1,746,249 | A | * | 2/1930 | Fausse | 36/77 M |
| 1,758,405 | A | * | 5/1930 | O'Donnell | 36/77 M |
| 2,077,125 | A | * | 4/1937 | Miller et al. | 442/103 |
| 2,390,347 | A | * | 12/1945 | Beckwitch et al. | 36/77 R |
| 4,735,003 | A | * | 4/1988 | Dykeman | 36/77 R |
| 4,862,606 | A | * | 9/1989 | Siskind et al. | 36/77 M |
| 5,832,633 | A | * | 11/1998 | Wang | 36/77 R |

* cited by examiner

*Primary Examiner*—Jila M. Mohandesi
(74) *Attorney, Agent, or Firm*—Rosenberg, Klein & Lee

(57) ABSTRACT

A composite reinforced toecap for a shoe includes multiple composite fiber reinforcement layers and a larger fiber layer laminated between and extending out from the composite fiber reinforcement layers. The fiber layer is made of continuos-strands. The composite fiber reinforcement layers are made of fiber-reinforced-plastic composite materials, are laminated on the fiber layer to form a pre-product toecap. A bonding coating is applied to the fiber layer that extends beyond the composite fiber reinforcement layer to form a binding. The pre-product is cured and has a binding that can be sewn to the sole, upper or tongue of a shoe.

8 Claims, 3 Drawing Sheets

COMPOSITE REINFORCED TOECAP AND A METHOD OF MAKING THE SAME

BACKGROUND OF THE INVENTION

1. Field of the Invention

The present invention relates to a composite reinforced toecap for a shoe, and more particularly to a composite reinforced toecap with a flexible binding so the toecap can be fastened conveniently to other parts of the shoe, such as an upper, a tongue and a sole with stitches.

2. Description of Related Art

Shoes or boots can protect human feet from injury. Especially, the shoes for some purposed usage, such as skating shoes or work boots always need a reinforced toecap to protect toes from injury. A shoe generally has an upper, a tongue, a toecap and a sole. The upper, the tongue, the toecap and the sole are normally fastened or joined together with stitches.

Three methods of fabricating a reinforced toecap for a shoe exist today. The first method uses injection molding to form thermoplastic materials, such as polyvinyl chloride (PVC) or thermoplastic polyurethane (TPU), into a toecap. However, a toecap made of thermoplastic materials does not enough protection because the tensile strength and impact strength of the thermoplastic materials are low relative to metal or composite materials. Furthermore, the thermoplastic materials cannot resist cold and become brittle at low temperature. Therefore, a toecap made of thermoplastic materials has weak resistance to cold, is thick to improve the tensile strength and the impact strength and consequently is generally bulky.

The second method uses fiber-reinforced plastic composite materials to fabricate the toecap. Glass fibers are normally used to reinforce plastic materials, such as thermosetting resins for the fiber-reinforced plastic composite materials used in the second method. The fiberglass-reinforced plastics overcome the weakness of the thermoplastic materials and provide enhanced mechanical properties. However, fastening the fiberglass-reinforced toecap to the upper, the tongue and the sole with stitches is difficult because of its rigidity. Sometimes, the fiberglass-reinforced toecap breaks the stitching needle.

The third method is a modification of the previous two methods. The toecap is manufactured with a combination of a body and a separate coating. The body is made entirely of fiberglass-reinforced plastics and has an outer edge. The coating is made by injection molding thermoplastic materials in another individual process and has a shape corresponding to the outer edge of the body. The coating is stuck along the outer edge of the body of the toecap after the body is formed. This kind of toecap overcomes the problems of stitching the toecap to the tongue, the sole and the upper. However, the body and the coating of the toecap normally cannot be firmly bonded because the mechanical properties of the fiberglass-reinforced plastics and the thermosetting plastics are different. Therefore, the body of the toecap may separate from the upper, the tongue or the sole while a person is wearing the shoes.

To overcome the shortcomings, the present invention provides an improved composite reinforced toecap for a shoe to mitigate or obviate the aforementioned problems.

SUMMARY OF THE INVENTION

The main objective of the invention is to provide a composite reinforced toecap for a shoe, which has a binding of fiber with at least one thermoplastic coating. The thermoplastic coating is a bonding material and is fused to edges of the fiber to form the binding. The fiber is laminated into the composite toecap with the binding extending from edges of the toecap so the binding is firmly fastened on the toecap. The binding is fastened to other parts of the shoe, such as the upper, the tongue and the sole with stitches to mount the toecap firmly in the shoe.

Other objectives, advantages and novel features of the invention will become more apparent from the following detailed description when taken in conjunction with the accompanying drawings.

DETAILED DESCRIPTION OF PREFERRED EMBODIMENT

Figure 1:
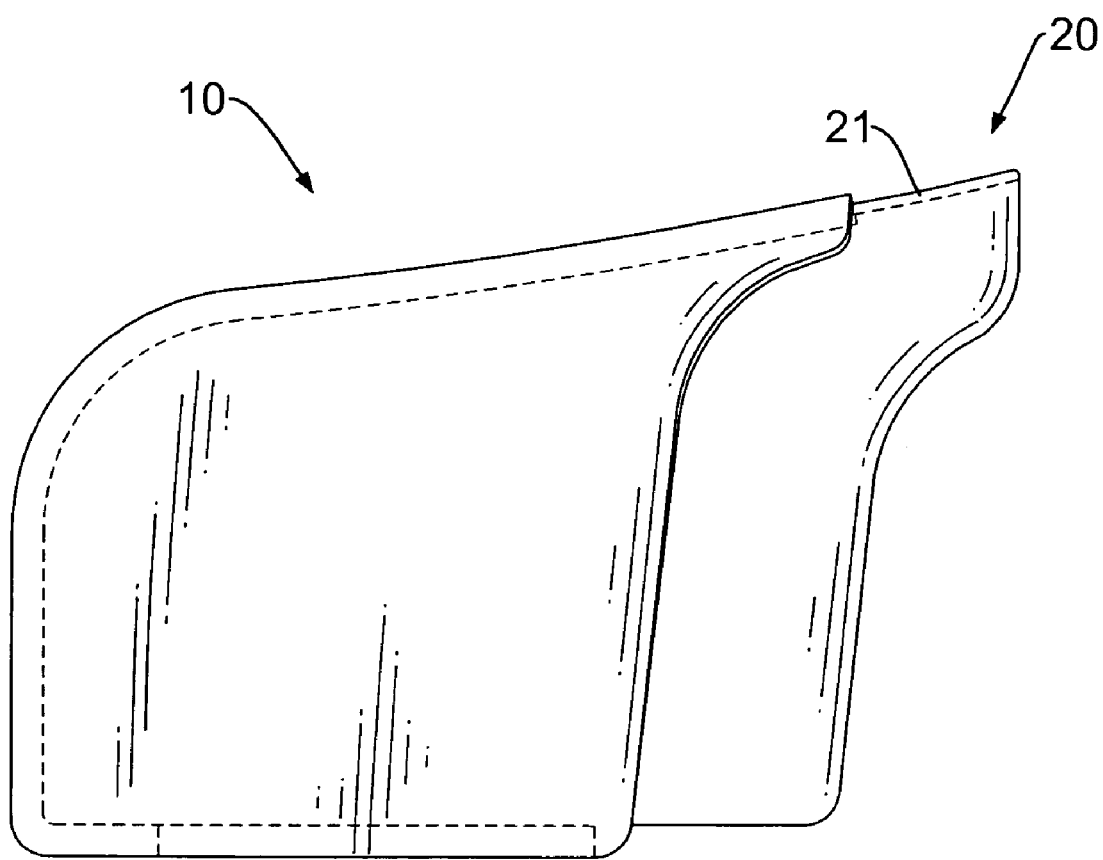
FIG. 1 is a side plan view of a toecap in accordance with the present invention.
Figure 2:
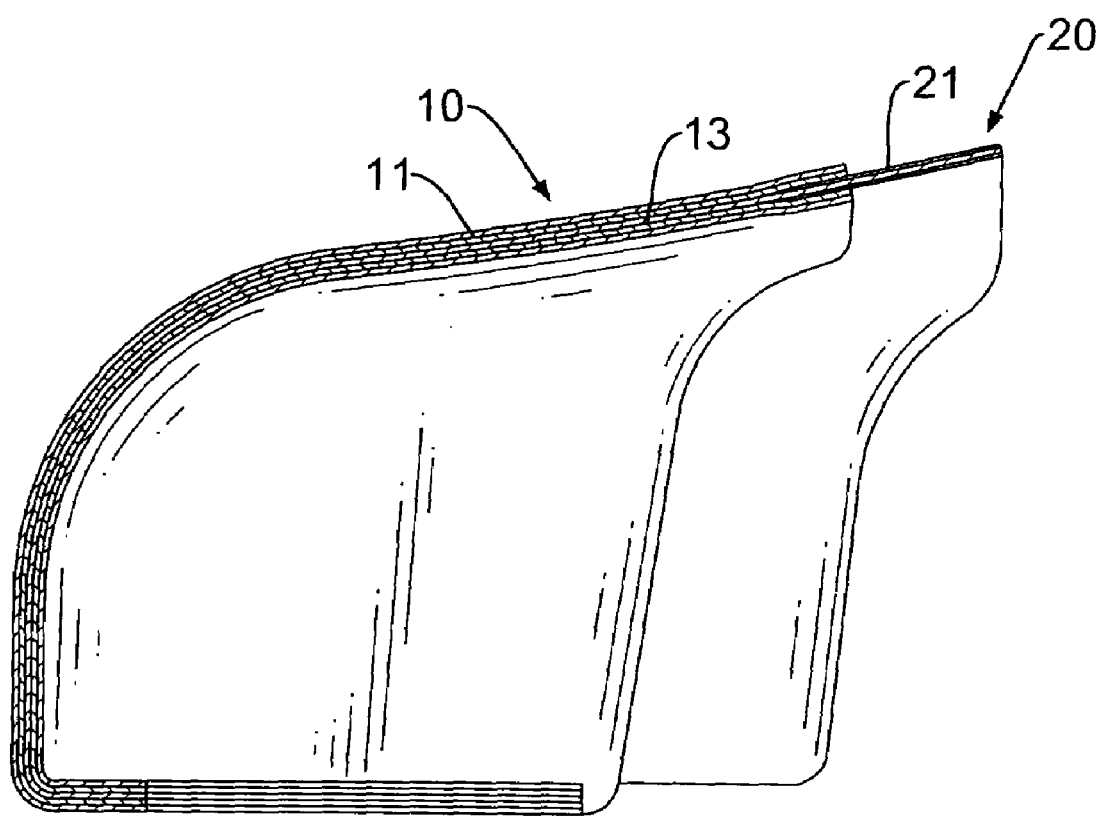
FIG. 2 is a cross sectional side plan view of the toecap in FIG. 1.

With reference to FIGS. 1 and 2, a reinforced toecap (10) for a shoe in accordance with the present invention comprises multiple composite fiber reinforcement layers (11), a fiber layer (13) and a binding (20).

The fiber layer (13) is a piece of continuos-strand material and has an interior surface (not numbered), an exterior surface (not numbered) and an outside edge (not numbered). The continuous-strand material may be continuous strands of glass fibers, carbon fibers or aramid fibers.

The composite fiber reinforcement layers (11) are fiber-reinforced-plastic composite materials that may use unsaturated polyester resin, ethylene resin or epoxy resin as matrix plastic resins and may be fiberglass-reinforced-plastic resin or carbon-fiber-reinforced-plastic resin materials. The composite fiber reinforcement layers (11) can be produced by many conventional processes for producing fiber-reinforced plastic composite materials, such as a vacuum bag-autoclave process or sheet-molding compound (SMC) process that uses a fiber material made of continuous strands of fiberglass or carbon fibers for reinforcing plastic resins.

The composite fiber reinforcement layers (11) are attached respectively to the exterior and the interior surfaces of the layer of the fiber layer (13) on a toe last (not shown) to form a pre-product toecap (10). The outside edge of the fiber layer (13) extends out beyond the edges of the composite fiber reinforcement layers (11).

The binding (20) is formed by coating the fiber layer (13) extending from the edge of the composite fiber reinforcement layers (11) with at least one bonding layer (21).

The at least one bonding layer (21) is made of thermoplastic material, such as polyamide (Nylon) films or polyurethane film and are applied respectively the exterior and the interior surfaces of the fiber layer (13) at the edge to form the binding (20). Each of the bonding layers (21) has an inside edge (not numbered). The inside edge is between the fiber reinforcement layers (11) adjacent to the fiber layer (13) and the fiber layer (13).

After the pre-product toecap (10) has been formed, the toecap (10) undergoes a conventional curing process to cure the fiber-reinforced-plastic resins. The curing process applies proper heat and pressure to cure composite fiber reinforcement layers (11) and the bonding layers (21) based on the type of resin of the composite fiber reinforcement layers (11). Since the bonding layers (21) are thermoplastic materials, the bonding layers (21) are fused by the heat and keep the fiber in the fiber layer (13) forming the binding (20) from fraying. Likewise, the resins of the composite fiber reinforcement layers (11) adjacent to the fiber layer (13) also bond the fiber layer (13) in the toecap (10).

The cured composite fiber reinforcement layers (11) cause the toecap (10) to have good rigidity and strength, such as high tensile strength, high impact strength and cold resistance. The at least one bonding layer (21) is attached firmly to the protruding the fiber layer (13) and provides an area for stitches.

The toecap (10) in accordance with the present invention can be attached firmly to the upper, the tongue and the sole of a shoe and has good mechanical properties to resist impacts and cold to protect human feet from injury.

Figure 3:
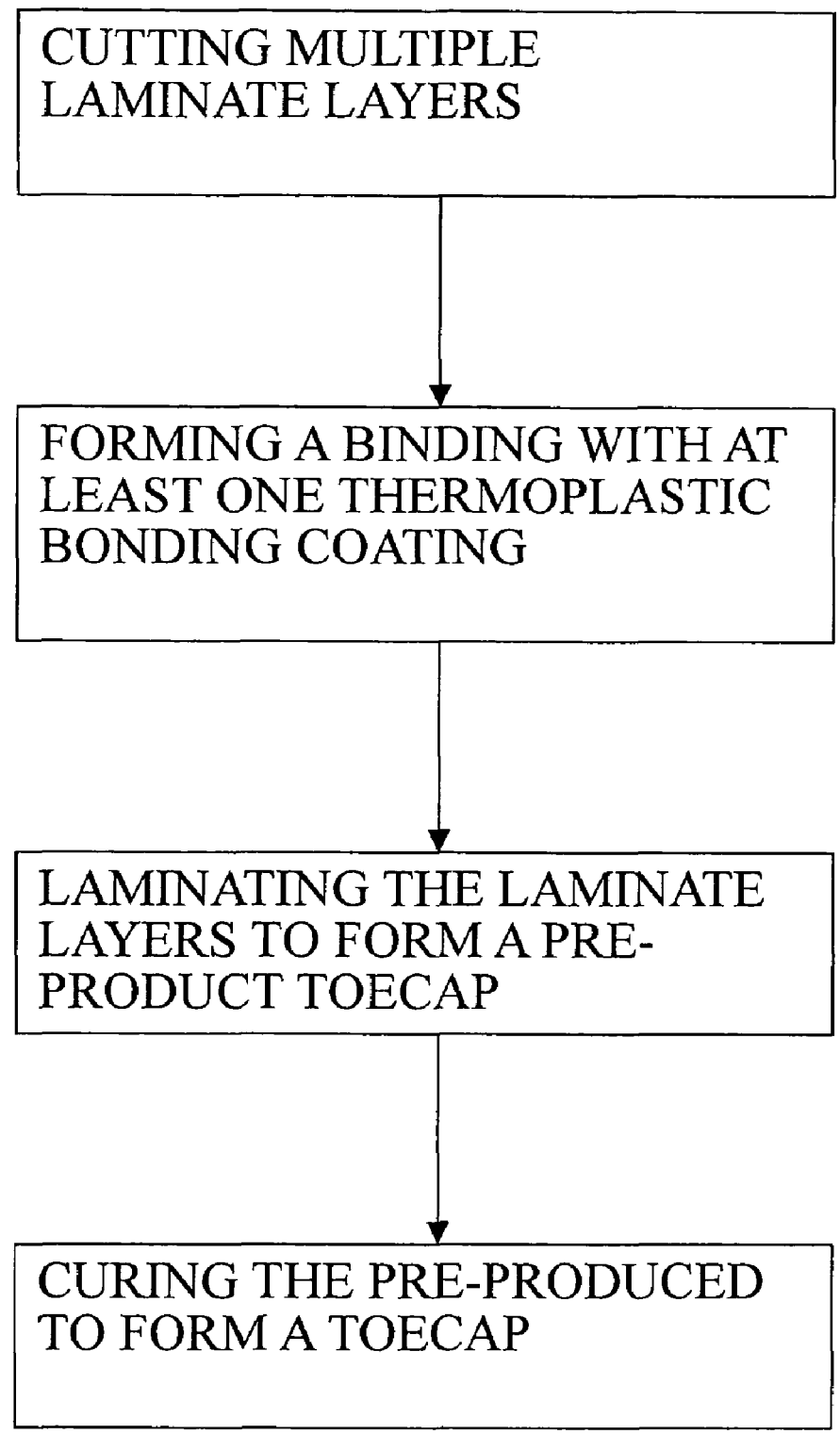
FIG. 3 is a flowchart of a method to make the toecap in FIG. 1 in accordance with the present invention.

With reference to FIG. 3, a method of making composite reinforced toecap (10) comprises cutting multiple laminate layers with one layer larger than the others, applying at least one thermoplastic bonding coating to edges of the larger layer, laminating the laminate layers together with the larger layer between other laminate layers to form a pre-product toecap (10) with a binding (20) and curing the pre-product to form the toecap (10).

The step of cutting multiple laminate layers with one larger layer forms multiple composite fiber reinforcement layers (11) and a larger internal fiber layer (13). The composite fiber reinforcement layers (11) respectively have outer edges (not numbered) and are made of fiber-reinforced-plastic resin materials. The fiber layer (13) has an outer edge (not numbered) that extends beyond the outer edges of the composite fiber reinforcement layers (11).

The step of applying at least one bonding coating (21) to edges of the larger layer applies thermoplastic material, such as polyamide (Nylon) film or polyurethane film, to the edge of the fiber layer (13) to form the binding (20).

The step of laminating the laminate layers together with the larger fiber layer between other layers to form a pre-product toecap (10) with a binding (20) laminates the fiber layer (13) between the composite fiber reinforcement layers (11) with the bonding coating (21) extending out from the edges of the composite fiber reinforcement layers (11). A mold or a toe last with a shape corresponding to the toecap (10) to carry out this step. A pre-product toecap is formed.

The step of curing the pre-product to form the toecap cures the assembled composite fiber reinforcement layers (11), the fiber (13) and the at least one bonding coating (21) to form the toecap (10).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A composite reinforced toecap for a shoe, and the toecap comprising: a fiber layer made of a piece of a continuos-strand material and having an interior surface, an exterior surface and an outside edge; multiple composite fiber reinforcement layers made of fiber-reinforced-plastic composite materials and attached respectively to the exterior and the interior surfaces of the fiber layer to form a pre-product toecap; and a binding formed by coating the outside edge of the fiber layer extending out from the composite fiber reinforcement layers with at least one thermoplastic bonding coating.

2. The composite reinforced toecap as claimed in claim 1, wherein the continuos-strand material is a fiberglass fabric.

3. The composite reinforced toecap as claimed in claim 1, wherein the continuos-strand material is a carbon fiber fabric.

4. The composite reinforced toecap as claimed in claim 1, wherein the continuos-strand material is an aramid fiber fabric.

5. The composite reinforced toecap as claimed in claim 1, wherein each of the composite fiber reinforcement layers is made of fiberglass-reinforced-plastic resins materials.

6. The composite reinforced toecap as claimed in claim 1, wherein each of the composite fiber reinforcement layers is made of carbon-fiber-reinforced-plastic resins materials.

7. The composite reinforced toecap as claimed in claim 1, wherein the at least one bonding coating is a polyamide (Nylon) film.

8. The composite reinforced toecap as claimed in claim 1, wherein the at least one bonding coating is a polyurethane film.

* * * * *